(12) United States Patent
Stachura et al.

(10) Patent No.: US 6,963,985 B2
(45) Date of Patent: Nov. 8, 2005

(54) AUTOMATIC POWER DOWN

(75) Inventors: Thomas L. Stachura, Portland, OR (US); Gregory V. Gritton, Forest Grove, OR (US); David C. Chalupsky, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 504 days.

(21) Appl. No.: 10/081,658

(22) Filed: Feb. 22, 2002

(65) Prior Publication Data

US 2003/0167413 A1 Sep. 4, 2003

(51) Int. Cl.⁷ .................................................. G06F 1/26
(52) U.S. Cl. ........................................ 713/310; 713/300
(58) Field of Search ........................................... 713/310

(56) References Cited

U.S. PATENT DOCUMENTS

| | | | | | |
|---|---|---|---|---|---|
| 5,842,027 | A | * | 11/1998 | Oprescu et al. | 713/300 |
| 6,449,677 | B1 | * | 9/2002 | Olarig et al. | 710/305 |
| 6,601,174 | B1 | * | 7/2003 | Cromer et al. | 713/202 |
| 6,618,814 | B1 | * | 9/2003 | Gaur et al. | 713/323 |
| 6,622,178 | B1 | * | 9/2003 | Burke et al. | 713/300 |
| 6,622,250 | B1 | * | 9/2003 | Castillo et al. | 713/300 |
| 6,675,303 | B1 | * | 1/2004 | Lam et al. | 713/320 |
| 6,675,356 | B1 | * | 1/2004 | Adler et al. | 715/530 |
| 6,820,171 | B1 | * | 11/2004 | Weber et al. | 711/114 |

OTHER PUBLICATIONS

*Inventor's Information Disclosure Statement, Jul. 16, 2002.*
*PCI Local Bus Specification, Revision 2.2,* Dec. 18, 1998.
*PCI Bus Power Management Interface Specification, Revision 1.1,* Dec. 18, 1998.
*Advanced Configuration and Power Interface Specification, Revision 2.0,* Jul. 27, 2000.

* cited by examiner

*Primary Examiner*—Lynne H. Browne
*Assistant Examiner*—Anand B. Patel
(74) *Attorney, Agent, or Firm*—Fish & Richardson P.C.

(57) ABSTRACT

An apparatus, system, method and product for automatically transitioning the physical layer interface of a peripheral device to a low power state when a signal is detected by the communication device on a peripheral bus. The technique may include transitioning to different low power states depending upon whether wake up of the device has been enabled by an operating system.

21 Claims, 3 Drawing Sheets

AUTOMATIC POWER DOWN

TECHNICAL FIELD

This invention relates to power management of network devices.

BACKGROUND

Industry establish hardware, software and data structure interfaces which, when implemented, enable an operating system to manage power consumption of peripheral devices and buses. Communication devices such as Ethernet network devices often incorporate industry standards giving the devices the ability to be powered down to a sleep state or an off state by the operating system of the computer.

DETAILED DESCRIPTION

Figure 1:
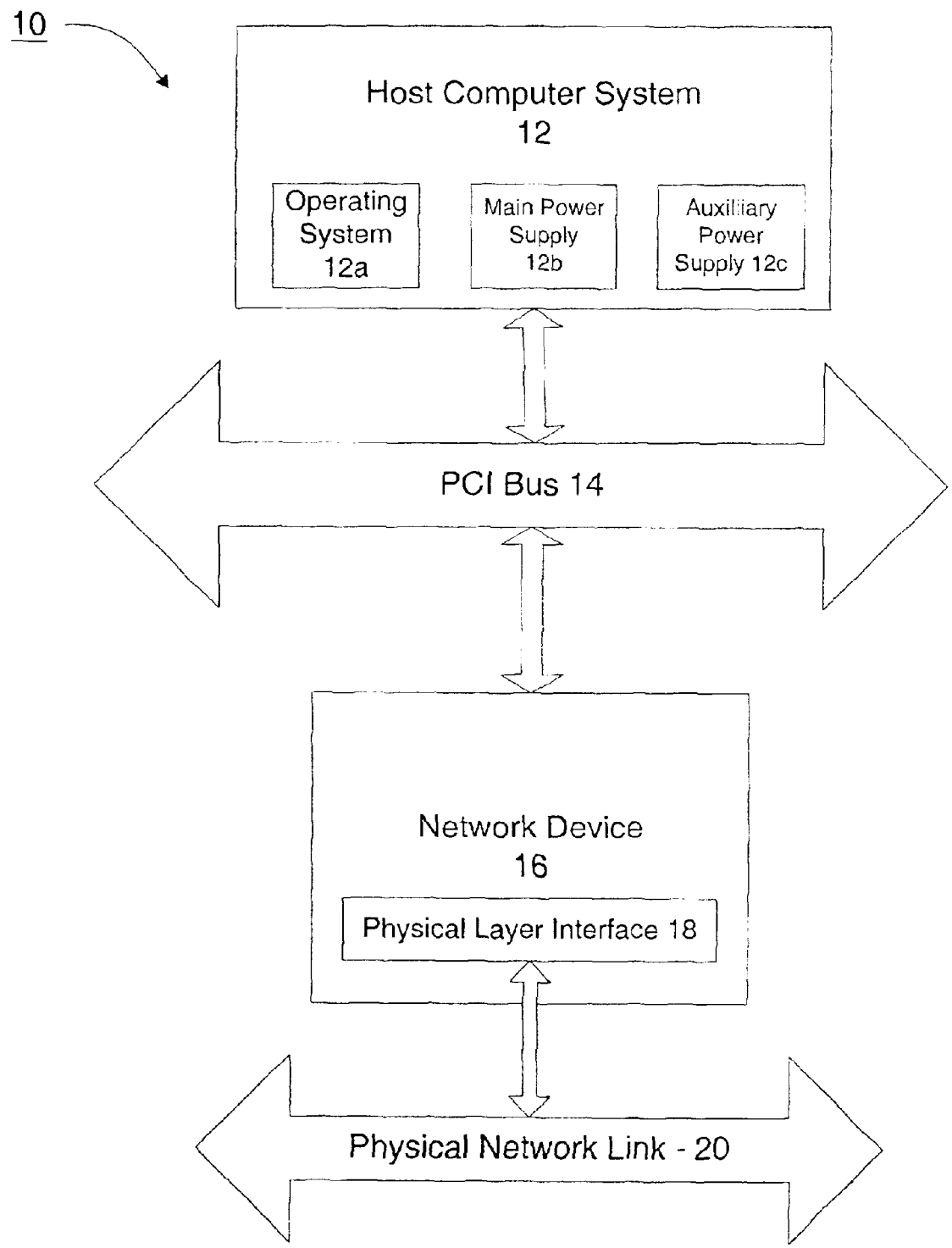
FIG. 1 is a diagram of a network device connected to a host computer system over a PCI Bus.

Referring to FIG. 1, a communication arrangement 10 includes a host computer system 12 and a network device 16, e.g., a Gigabit Ethernet device, that both interface with a Peripheral Component Interconnect (PCI) bus 14. The host computer system 12 executes an operating system 12a stored on a computer readable medium (not shown) and loaded into resident memory (not shown) when the host computer system 12 boots up. The operating system 12a controls functions of the host computer system 12 and could cause the host computer system 12 or the network device 16 to enter a sleep or low power state. The host computer system includes a main power supply 12b and an auxiliary power supply 12c. The network device 16 includes a physical layer interface 18 that interfaces with a physical network link 20.

Figure 2:
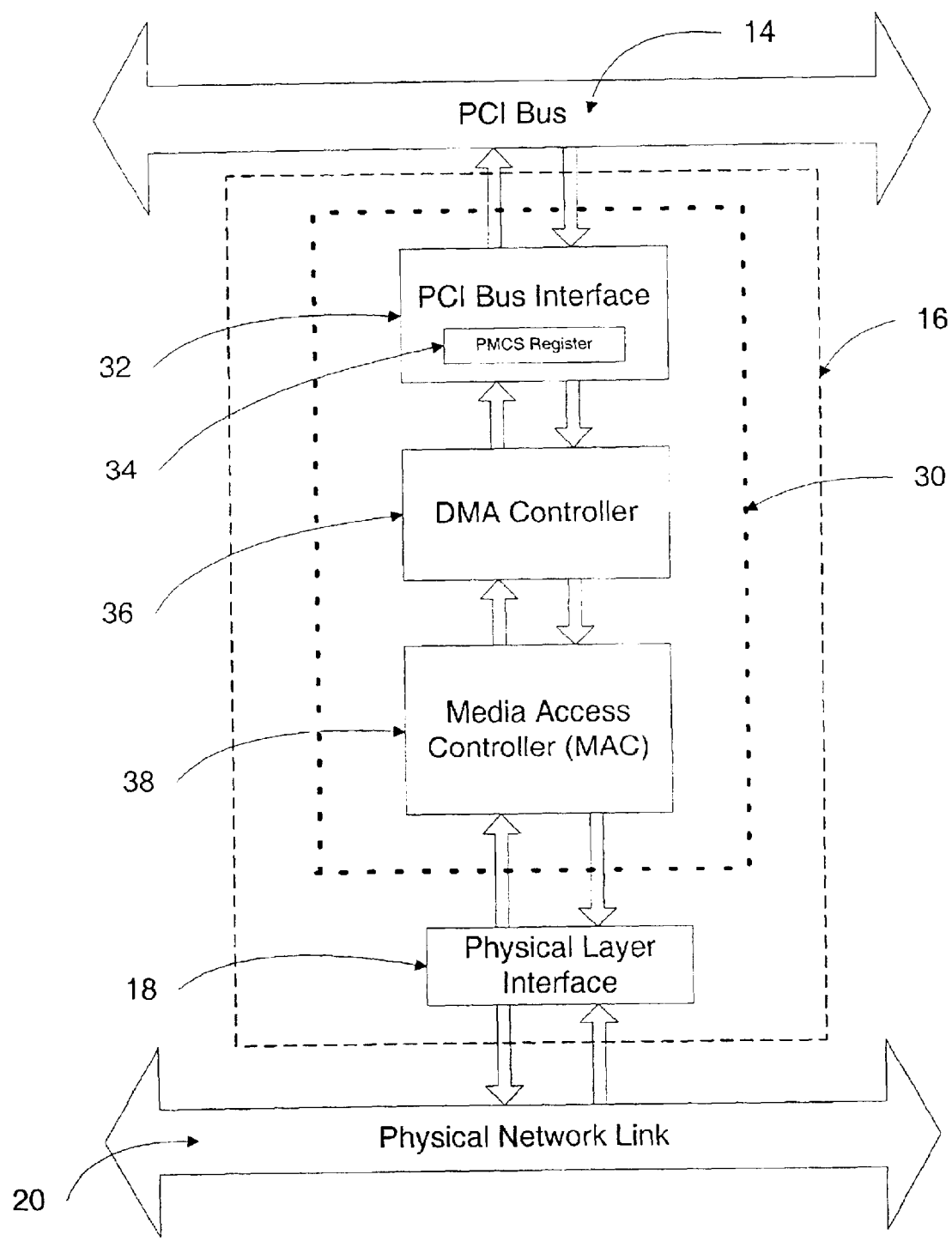
FIG. 2 is a diagram of a Gigabit Ethernet device with an integrated physical layer interface.

Referring to FIG. 2, a Gigabit Ethernet device 16 interfaces with a PCI bus 14 and a physical network link 20. The Gigabit Ethernet device 16 includes a Media Access Control (MAC) subsystem 30 and an electrically powered physical layer interface 18. The MAC subsystem 30 includes a PCI Bus Interface 32, a Direct Memory Access (DMA) Controller 36, and a Media Access Controller (MAC) 38. The PCI Bus Interface 32 includes a 16-bit Power Management Control/Status (PMCS) Register 34 which includes a two-bit Power State field (not shown) used both to determine the current power state of the device 16 by the operating system 12a and to permit the operating system 12a to set the device 16 to a different power management state in accordance with the definitions provided in Table I.

TABLE I

| Bit Value | Power Management State of Device 16 | Power Management State Definition (consistent with Advanced Configuration and Power Interface (ACPI) Specification, Revision 2.0, published Jul. 27, 2000) |
|---|---|---|
| 00 | D0 | Device 16 is on and running. It is receiving full power from the host computer system 12 and is delivering full functionality to the user. |
| 11 | D3 | Device 16 is off. |

Other embodiments may support the additional ACPI Specification 2.0 power management states D1 and D2, in which case the operating system may write the additional bit values set out in Table II to transition the device 16 to power management state D1 or D2.

TABLE II

| Bit Value | Power Management State | Power Management State Definition (consistent with ACPI Specification 2.0) |
|---|---|---|
| 01 | D1 | Device 16 is in a low-power sleep state which device context may or may not be lost. |
| 10 | D2 | Device is in a low-power state at attains greater power savings than state D1 in which device context may or may not be lost. |

Figure 3:
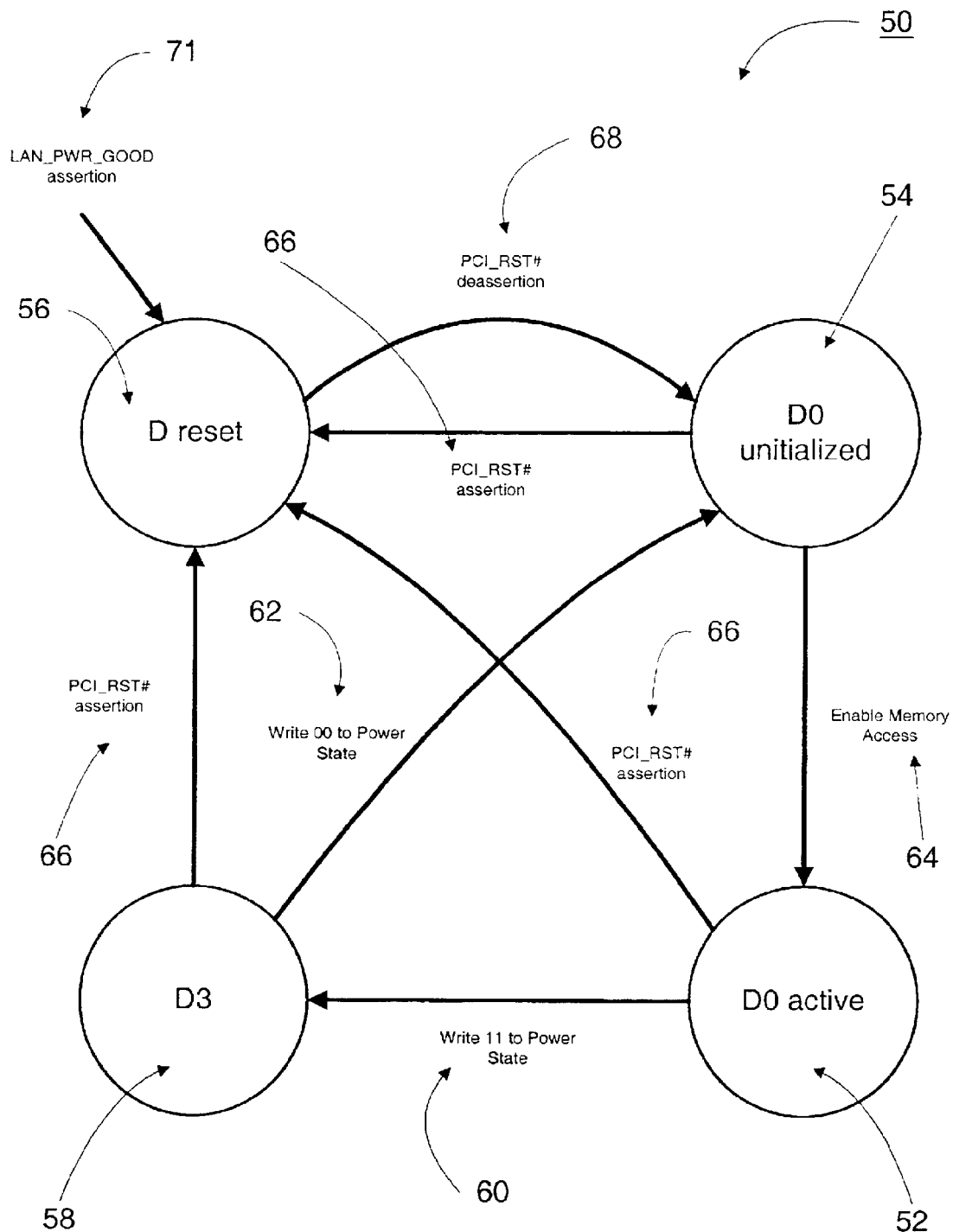
FIG. 3 is a diagram of power management state transitions of the Gigabit Ethernet device of FIG. 2.

Referring to FIG. 3, a power management state transition 50 of the Gigabit Ethernet device 16 depicted in FIG. 2 is shown. The Gigabit Ethernet device 16 has four power management states, D0 Active (52), D0 Uninitialized (54), D Reset (56) and D3 (58) and they are generally defined in Table III.

TABLE III

| Power Management State of Device 16 | Definition |
|---|---|
| D0 Active | Device 16 is on and running and is delivering full functionality and performance to the user. |
| D0 Uninitialized | Device 16 is powering up and awaiting initialization by Basic Input/Output System (BIOS). |
| D Reset | A PCI reset signal is asserted and the device 16 is and is awaiting a deassertion of the PCI reset signal. |
| D3 | Device 16 is off. |

D0 Active (52) and D0 Uninitilized (54) are subsets of the ACPI Specification 2.0 power management state D0. Additionally, the Gigabit Ethernet device's 16 power management state D3 (58) includes the $D3_{hot}$ state, which means that the Gigabit Ethernet device 16 can be transitioned to the D0 Uninitialized (54) state via software by writing "00" to the device's 16 Power Management Control/Status register 34 or by having the PCI reset signal asserted. The Gigabit Ethernet device 16 power management state D3 (58) also includes the $D3_{cold}$ power management state, which means that the Gigabit Ethernet device 16 is transitioned to a D0 Uninitialized state (54) by reapplying the main power supply, 12b and deasserting the PCI reset signal. However, other embodiments may only support the $D3_{cold}$ power management state or the $D3_{hot}$ power management state.

The Gigabit Ethernet device 16 may transition to a different power management state as a result of the operating system 12a or Basic Input/Output System (BIOS) directing a power management state change (60, 62, 64). For example, if the Gigabit Ethernet device 16 is up and running in the D0 Active state (52) and the operating system 12a writes "11" to the Power State field in the Power Management Control/Status Register (62), the device 16 transitions to state D3 (58). Similarly, if the device 16 is in power management state D3 (58) and the operating system 12a writes "00" to the Power State field in the Power Management Control/Status Register (62), the device 16 transitions to state D0 Uninitialized (54). The device 16 also transitions from D0 Uninitialized (54) to the D0 Active (52) when the BIOS writes a "1" to the memory access enable bit (64) of a PCI command register (not shown) on the PCI interface 32.

In addition to changing power management states as a result of direction from the operating system (60, 62) or BIOS (64), the Gigabit Ethernet device 16 also automatically changes power management states upon detecting an assertion or deassertion of the PCI reset signal (66, 68) or an assertion of the chip reset signal (71).

An assertion of a PCI reset signal (PCI_RST#) occurs shortly before the host computer system 12 transitions from its main power supply 12b to its auxiliary power supply 12c.

The PCI bus interface 32 is configured to monitor the PCI reset signal on the PCI bus 14. If an assertion of the PCI reset signal (PCI_RST#) is detected (66), the MAC subsystem 30 automatically reverts the device 16 to a reset power state, D Reset (56). The device 16 remains in state D Reset (56) until the PCI interface 32 senses a deassertion of the PCI reset signal (68), which causes the MAC subsystem 30 to transition the device 16 to the D0 Uninitialized state (54).

The device 16 is also in the D Reset state (56) when it receives a chip reset signal (LAN_PWR_GOOD assertion) (71) the first time the host computer system 12 receives power after power down of both the main 12b and auxiliary 12c power supplies.

Referring to FIGS. 1–3, the MAC subsystem 30 controls the power to the physical layer interface 18 dependent upon the power management state of the device 16 and whether wake-up is enabled. A one-bit Power Management Event Enable (PME_En) field within the PMCS Register 34 indicates whether wake up has been enabled. Wake up may be enabled or disabled by the operating system 12a. Wake up could also be more permanently enabled (or disabled) by hardwiring the PME_En field in the PMCS Register 34. The MAC subsystem 30 uses this field to determine whether wake up is required.

The MAC subsystem 30 transitions the physical layer interface 18 into one of three power states depending upon the power management state of the Gigabit Ethernet device 16 (i.e., D0 Active, D0 Uninitilized, D Reset or D3) and whether wake up has been enabled by the operating system 12a. The three power states of the physical layer interface 18 are defined in Table IV below.

TABLE IV

| Power State of Physical Layer Interface 18 | Definition |
| --- | --- |
| High | Physical Layer Interface 18 is configured to transmit/receive data at full 1,000 Mbps rate. |
| Low | Physical Layer Interface 18 is configured to transmit/receive data at 100 or 10 Mbps. |
| Off | Physical Layer Interface 18 is powered off; not transmitting/receiving any data. |

When the MAC subsystem 30 transitions the physical layer interface 18 from its high power state to its low power state, the physical layer interface 18 will re-negotiate its data link speed from 1000 megabits per second to 100 or 10 megabits per second. Similarly, when the MAC subsystem 30 transitions the physical layer interface 18 from its high power state to its off power state, the physical layer interface 18 ceases any transmission or receipt of data.

Table V illustrates how the MAC subsystem 30 controls power to the physical layer interface 18 in each of the four power management states when wake up is enabled and disabled.

TABLE V

| Power Management State of Device 16 | Wake Up | Power State of Physical Layer Interface 18 |
| --- | --- | --- |
| D0 Active | Enabled | High |
| D0 Active | Disabled | High |
| D0 Uninitialized | Enabled | Low |
| D0 Uninitialized | Disabled | Off |
| D Reset | Enabled | Low |
| D Reset | Disabled | Off |
| D3 | Enabled | Low |
| D3 | Disabled | Off |

Many computer systems provide for an auxiliary power supply in the event of a loss or power down of a system's main power supply. In a computer system built in accordance with certain specifications, e.g., PCI Bus Power Management Interface Specification, Revision 1.1., published Dec. 18, 1998, devices that use the auxiliary power supply are limited to draw a certain amount of current, e.g., 375 mA, from the PCI bus. A device that draws more than the threshold amount of current may cause a reduction in voltage which could result in incorrect operation of the host computer system or may damage the auxiliary power supply.

The Gigabit Ethernet device 16 is capable of transmitting up to 1000 megabits of data per second, which is a 10-fold increase over 100 megabit Fast Ethernet and a 100-fold increase over 10 megabit Ethernet. While the Gigabit Ethernet device 16 is capable of high-speed data transfer, the physical layer interface 18 of Gigabit Ethernet device 16 can consume significant amounts of power when it is in its high power state (i.e., transmitting/receiving data at 1000 megabits per second). In the event of the host computer system 12 losing or powering down it's main power supply 12b, the Gigabit Ethernet device 16 with a fully-powered physical layer interface 18 could draw more than the threshold amount of current, e.g. 375 mA, from the auxiliary power supply 12c and risk incorrect operation of the computer system 12 or damage to the auxiliary power supply 12c. However, when the physical layer interface 18 is operating in it's low power state (i.e., transmitting/receiving data at 10 or 100 megabits per second) or its off power state, the physical layer interface 18 will not draw more than the threshold of amount current of the auxiliary power supply 12c.

By automatically changing the power management state of the Gigabit Ethernet device 16 out of D0 (52) and powering down the physical layer interface 18 to a low or off state shortly before the main power supply 12b powers down, the risk of the physical layer interface 18 drawing excessive current from the auxiliary power supply 12c is reduced.

A number of embodiments of the invention have been described. Nevertheless, it will be understood that various modifications may be made without departing from the spirit and scope of the invention.

For example, the automatic power down technique described may be incorporated in any communications device which has a physical layer interface that may draw current in excess of a threshold amount of current from an auxiliary power supply, such as a wireless Local Area Network (LAN) device.

Additionally, the technique may be implemented in any peripheral device in a communications arrangement that generates a signal indicating that the computer system is powering down its power supply or transitioning to an auxiliary power supply. Communications arrangements that utilize a standard PCI or PCI-X bus and otherwise comply with PCI Bus Power Management Specification 1.1., Dec. 18, 1998, PCI Local Bus Specification, Revision 2.2, Dec. 18, 1998, or PCI-X Addendum to the PCI Local Bus Specification, Revision 1.0A, Jul. 24, 2000, are examples of communication arrangements in which a peripheral device may utilize this technique.

The power states of the physical layer interface may be defined in a number of ways so long as the physical layer interface transitions to a power state in which it operates below auxiliary power source threshold (e.g., 375 mA) when the device detects a signal on the bus indicating that the main power supply is about to go down. For example, the device may be designed to automatically power off the physical layer interface whenever a PCI reset signal is asserted regardless whether wake up has been enabled.

Accordingly, other embodiments are within the scope of the following claims.

What is claimed is:

1. An apparatus comprising:
an electrically powered physical layer interface to interface between a PCI-type bus and a network, the physical layer interface having a high power state, a first low power state, and a second low power state; and
a power management system configured to transition the physical layer interface from the high power state to one of the low power states when a PCI reset signal assertion is detected on the PCI-type bus.

2. The apparatus of claim 1, wherein the PCI-type bus is a PCI bus.

3. The apparatus of claim 1, wherein the PCI-type bus is a PCI-X bus.

4. The apparatus of claim 1, wherein the first low power state is when the physical layer interface is powered off.

5. The apparatus of claim 4, wherein the second low power state is a state in which the physical layer interface draws no more than a predetermined amount of current.

6. An apparatus comprising:
an electrically powered physical layer interface to interface between a bus and a network, the physical layer interface having a high power state, a first low power state, and a second low power state; and
a power management system configured to transition the physical layer interface from the high power state to one of the low power states when a PCI reset signal assertion is detected on the bus, wherein the power management system is incorporated within a Gigabit Ethernet device.

7. The apparatus of claim 6, wherein the first low power state is a state in which the physical layer interface is transmitting or receiving data at no greater than 100 megabits per second.

8. A system comprising:
a power supply;
a PCI-type bus electrically connected to the power supply;
a central processing unit in communication with the PCI-type bus; and
a communications device in communication with PCI-type bus, the communications device comprising:
an electrically powered physical layer interface having a high power state, a first low power state, and a second low power state; and
a power management system configured to transition the physical layer interface to the low power state when a PCI reset signal assertion is detected on the PCI-type bus.

9. The system of claim 8, wherein the PCI-type bus is a PCI bus.

10. The system of claim 8, wherein the PCI-type bus is a PCI-X bus.

11. A system comprising:
a power supply;
a bus electrically connected to the power supply;
a central processing unit in communication with the bus; and
a communications device in communication with bus, the communications device comprising:
an electrically powered physical layer interface having a high power state, a first low power state, and a second low power state wherein the first low power state is an off state and the second low power state is a state in which the communications device transmits data at a reduced rate; and
a power management system configured to transition the physical layer interface to the low power state when a PCI reset signal assertion detected on the bus.

12. The system of claim 11, wherein the communications device includes a register having at least a one-bit field, and the system further comprises:
a storage device;
an operating system stored on the storage device and configured to write data to the field in the register if wake up of the communications device is enabled or disabled; and
wherein the power management system is configured to transition the first or second power state depending upon whether wake up is enabled or disabled.

13. The system of claim 11, wherein the communications device is a Gigabit Ethernet device.

14. The system of claim 13, wherein one of the low power state of the physical layer interface is a state in which the physical layer interface transmits or receives data at less than or equal to 100 megabits per second.

15. The system of claim 8, wherein the communication device is a wireless local area network controller.

16. The system of claim 13, wherein the power management system is incorporated within the Gigabit Ethernet device.

17. A method comprising:
within a networked computer system having an operating system, monitoring a bus that supplies power to a Gigabit Ethernet device that includes a register and an electrically powered physical layer interface, wherein the physical layer interface is configured to include a high power state, a first low power state in which the physical layer interface is not enabled to transmit data to or receive data from the network, and a second low power state;
writing data to the register by the operating system to indicate whether wake up of the device is enabled or disabled; and
changing the power state of a physical layer interface to the first or second low power state when a PCI reset signal assertion is detected on the bus depending upon whether wake up of the device has been enabled.

18. The method of claim 17, wherein the second low power state is a state in which the physical layer interface is configured to transmit data to or receive data from the network at rates up to 100 megabits per second.

19. The method of claim 18, wherein the bus is a PCI-type bus.

20. A computer program product residing on a computer readable medium for powering down a physical layer interface, comprising instructions for causing an instruction processor to:
- monitor a bus for assertion of a PCI reset signal assertion on the bus; and
- reduce the power state of the physical layer interface from a high power state to either a first or second low power state when the signal is detected on the bus;
- write data to a register by the operating system to indicate whether wake up of the device is enabled or disabled; and
- reduce the power state of the physical layer interface to the first low power state if the data in the register indicates that wake up is disabled at the time the PCI reset signal assertion detected or to the second low power state if the data in the register indicates that wake up is enabled at the time the PCI reset signal assertion is detected.

21. The computer program product of claim 20 wherein the device is a Gigabit Ethernet device.

* * * * *